United States Patent
Sharma et al.

(10) Patent No.: US 12,052,670 B2
(45) Date of Patent: *Jul. 30, 2024

(54) TERMINAL DEVICE, TELECOMMUNICATIONS APPARATUS AND METHODS

(71) Applicant: Sony Group Corporation, Tokyo (JP)

(72) Inventors: Vivek Sharma, Basingstoke (GB); Yuxin Wei, Basingstoke (GB); Hideji Wakabayashi, Basingstoke (GB); Samuel Asangbeng Atungsiri, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/178,555

(22) Filed: Mar. 6, 2023

(65) Prior Publication Data

US 2023/0209473 A1    Jun. 29, 2023

Related U.S. Application Data

(63) Continuation of application No. 17/277,294, filed as application No. PCT/EP2019/075292 on Sep. 20, 2019, now Pat. No. 11,617,138.

(30) Foreign Application Priority Data

Sep. 27, 2018   (EP) .................................... 18197363

(51) Int. Cl.
*H04W 52/24* (2009.01)
*H04L 1/00* (2006.01)
*H04W 52/28* (2009.01)

(52) U.S. Cl.
CPC ......... *H04W 52/241* (2013.01); *H04L 1/0009* (2013.01); *H04L 1/0032* (2013.01);
(Continued)

(58) Field of Classification Search
CPC ............ H04W 52/241; H04W 52/242; H04W 52/282; H04W 52/283; H04L 1/0009; H04L 1/0032
See application file for complete search history.

(56) References Cited

U.S. PATENT DOCUMENTS

| | | | |
|---|---|---|---|
| 10,356,652 B2* | 7/2019 | Ma | H04W 28/0252 |
| 2012/0009969 A1* | 1/2012 | Park | H04W 52/146 |
| | | | 455/522 |
| 2018/0315323 A1* | 11/2018 | Winkler | H04L 67/12 |

FOREIGN PATENT DOCUMENTS

| | | |
|---|---|---|
| EP | 2408239 A1 | 1/2012 |
| GB | 2384394 A | 7/2003 |
| KR | 2016-0046247 A | 4/2016 |

OTHER PUBLICATIONS

International Search Report and Written Opinion mailed on Dec. 9, 2019, received for PCT Application PCT/EP2019/075292 filed on Sep. 20, 2019, 11 pages.

(Continued)

*Primary Examiner* — John J Lee
(74) *Attorney, Agent, or Firm* — XSENSUS LLP

(57) ABSTRACT

A method of transmitting data by a terminal device operating in a wireless communications system comprising a non-terrestrial network access node and the terminal device, comprises the terminal device receiving an indication of an initial value of a set of one or more communications parameters for transmitting radio signals carrying the data, and modelling a state of a communications channel from the terminal device to a non-terrestrial network access node, in which a link adaptation procedure is used to select a revised value of the set of the one or more communications parameters with respect to the initial value of the set of the one or more communications parameters for the modelled channel state, and the method includes adapting the value of the set (Continued)

of the one or more communications parameters according to the revised value.

18 Claims, 5 Drawing Sheets

(52) U.S. Cl.
CPC ....... *H04W 52/242* (2013.01); *H04W 52/282* (2013.01); *H04W 52/283* (2013.01)

(56) References Cited

OTHER PUBLICATIONS

Holma et al., "LTE for UMTS OFDMA and SC-FDMA Based Radio Access", John Wiley and Sons, 2009, pp. 25-27.
Moosavi et al., "A Fast Scheme for Blind Identification of Channel Code", Global Telecommunications Conference, IEEE, Dec. 5, 2011, 5 pages.
3GPP, "NR; Multiplexing and Channel Coding (Release 15)", TS 38.212 V15.2.0, Jun. 2018, pp. 1-98.
3GPP, "NR; NR and NG-RAN Overall Description; Stage 2 (Release 15)", TS 38.300 V15.2.0, Jun. 2018, pp. 1-87.
3GPP, "NR; Medium Access Control (MAC) Protocol Specification (Release 15)", TS 38.321 V15.3.0, Sep. 2018, pp. 1-76.
3GPP, "Study on New Radio (NR) to Support Non Terrestrial Networks (Release 15)", TR 38.811 V1.0.0, Jun. 2018, pp. 1-136.
3GPP, "NR; Physical layer procedures for control (Release 15)", TS 38.213 V15.2.0, Jun. 2018, pp. 1-99.
3GPP, "NR; Physical Layer Procedures for Data (Release 15)", TS 38.214 V15.2.0, Jun. 2018, pp. 1-94.
3GPP, "Evolved Universal Terrestrial Radio Access (E-UTRA); Radio Resource Control (RRC); Protocol Specification (Release 16)", TS 36.331 V16.2.1, Sep. 2020, pp. 1-1064.
3GPP, "Study on New Radio (NR) to Support Non Terrestrial Networks (Release 15)", TR 38.811 V15.0.0, Jun. 2018, pp. 1-118.
3GPP, "Study on New Radio (NR) to Support Non Terrestrial Networks (Release 15)", 3GPP TR 38.811 V0.3.0, Dec. 2017, pp. 1-56.

* cited by examiner

TERMINAL DEVICE, TELECOMMUNICATIONS APPARATUS AND METHODS

CROSS-REFERENCE TO RELATED APPLICATIONS

The present application is a continuation of U.S. application Ser. No. 17/277,294, filed Mar. 18, 2021, which is based on PCT filing PCT/EP2019/075292, filed Sep. 20, 2019, which claims priority to EP 18197363.7, filed Sep. 27, 2018, the entire contents of each are incorporated herein by reference.

BACKGROUND

Field

The present disclosure relates to telecommunications apparatus, terminal devices configured to communicate in co-operation with a telecommunications and methods. In some embodiments the telecommunications system may include a non-terrestrial network access node.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

In view of this there is expected to be a desire for future wireless communications networks, for example those which may be referred to as 5G using a new radio (NR) system/new radio access technology (RAT) systems, as well as future iterations/releases of existing systems, to efficiently support a wide range of devices associated with different operating characteristics in areas that may be difficult to service from conventional terrestrial networks, for example in the open sea.

One area of current interest in this regard includes so-called "non-terrestrial networks", or NTN for short. The 3GPP has proposed in Release 15 of the 3GPP specifications to develop technologies for providing coverage by means of one or more antennas mounted on an airborne or space-borne vehicle [1].

Non-terrestrial networks may provide service in areas that cannot be covered by terrestrial cellular networks (i.e. those where coverage cannot be provided by means of land-based antennas), such as isolated or remote areas, on board aircraft or ship) and/or may be used to provide enhanced service in areas that are also served by land-based network nodes. The expanded coverage that may be achieved by means of non-terrestrial networks may provide service continuity for machine-to-machine (M2M) or 'internet of things' (IoT) devices, or for passengers on board moving platforms (e.g. passenger vehicles such as aircraft, ships, high speed trains, or buses). Other benefits may arise from the use of non-terrestrial networks for providing multicast/broadcast resources for data delivery.

The use of different types of network infrastructure equipment, such as NTN nodes and requirements for coverage enhancement give rise to new challenges for handling communications in wireless telecommunications systems that need to be addressed.

SUMMARY

Respective aspects and features of the present disclosure are defined in the appended claims.

Embodiments of the present technique can for example provide a method of transmitting data by a terminal device operating in a wireless communications system. The wireless communications system may comprise a non-terrestrial network access node and the terminal device. The method comprises the terminal device receiving an indication of an initial value of a set of one or more communications parameters for transmitting radio signals carrying the data, modelling a state of a communications channel from the terminal device to a receiver of the radio signals, in which a link adaptation procedure is used to select a revised value of the set of the one or more communications parameters with respect to the initial value of the set of the one or more communications parameters for the modelled channel state, and adapting the value of the set of the one or more communications parameters according to the revised value. The method then includes transmitting radio signals representing the data using the set of the one or more communications parameters. The method may also include determining whether the revised communications parameters have changed with respect to the initial parameters, and so only revising the communications parameters if these have changed with respect to the initial value.

Embodiments of the present technique can provide an arrangement in which link adaptation is performed without a feedback of a channel state of the communications channel from a receiver of uplink data, thereby saving on communications resources required for a feedback channel or indeed making link adaptation possible where a round trip delay makes providing feedback of a channel state in practical. Embodiments may also be provided correspondingly for down link transmissions. Embodiments can find application with non-terrestrial network access nodes which are typically deployed at greater distances requiring greater transmission propagation times inhibiting feedback or reference signals to be transmitted and received or for examples in which no communications resources are available for transmitting channel state information measured at a receiver.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
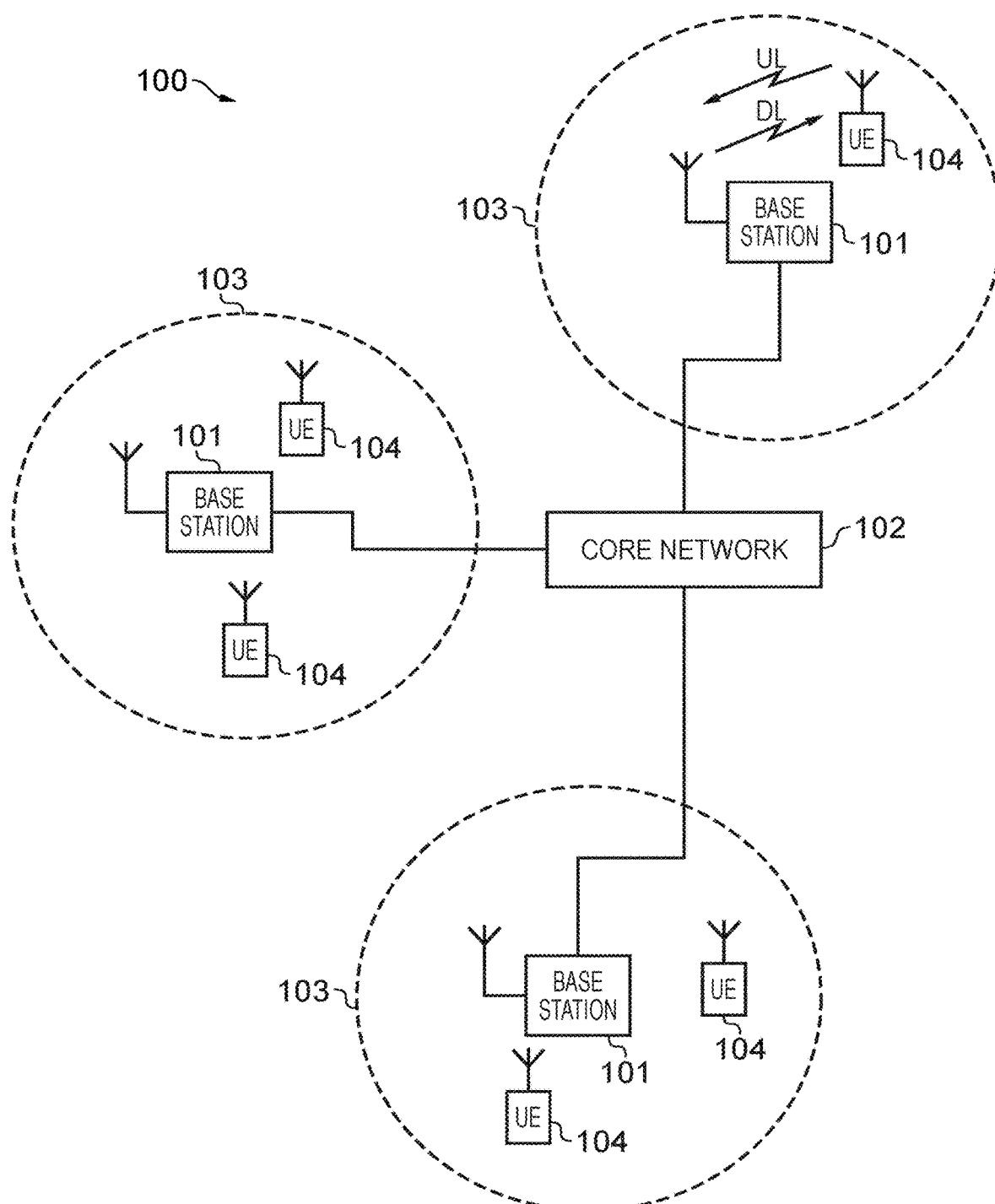
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body and associated proposals, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 (i.e. a cell/spot-beam) within which data can be communicated to and from terminal devices 104. In accordance with NTN proposals one or more base stations may be non-terrestrial, e.g. satellite based. In this regard it will be appreciated that satellite based means that the base station may be either physically on board of a non-terrestrial platform such as a satellite, or transmissions between the base station and the UEs transit through a non-terrestrial platform such as a satellite. Data is transmitted from base stations 101 to terminal devices 104 within their respective coverage areas 103 via a radio downlink. The coverage area may be referred to as a cell, and in the case of an NTN base station/radio access node, the coverage area may also be referred to as a spot-beam (a single NTN platform may support multiple spot-beams) Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/NodeBs/e-NodeBs, g-NodeBs and so forth, and as noted above in an NTN network one or more base stations may be satellite based. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

Figure 2:
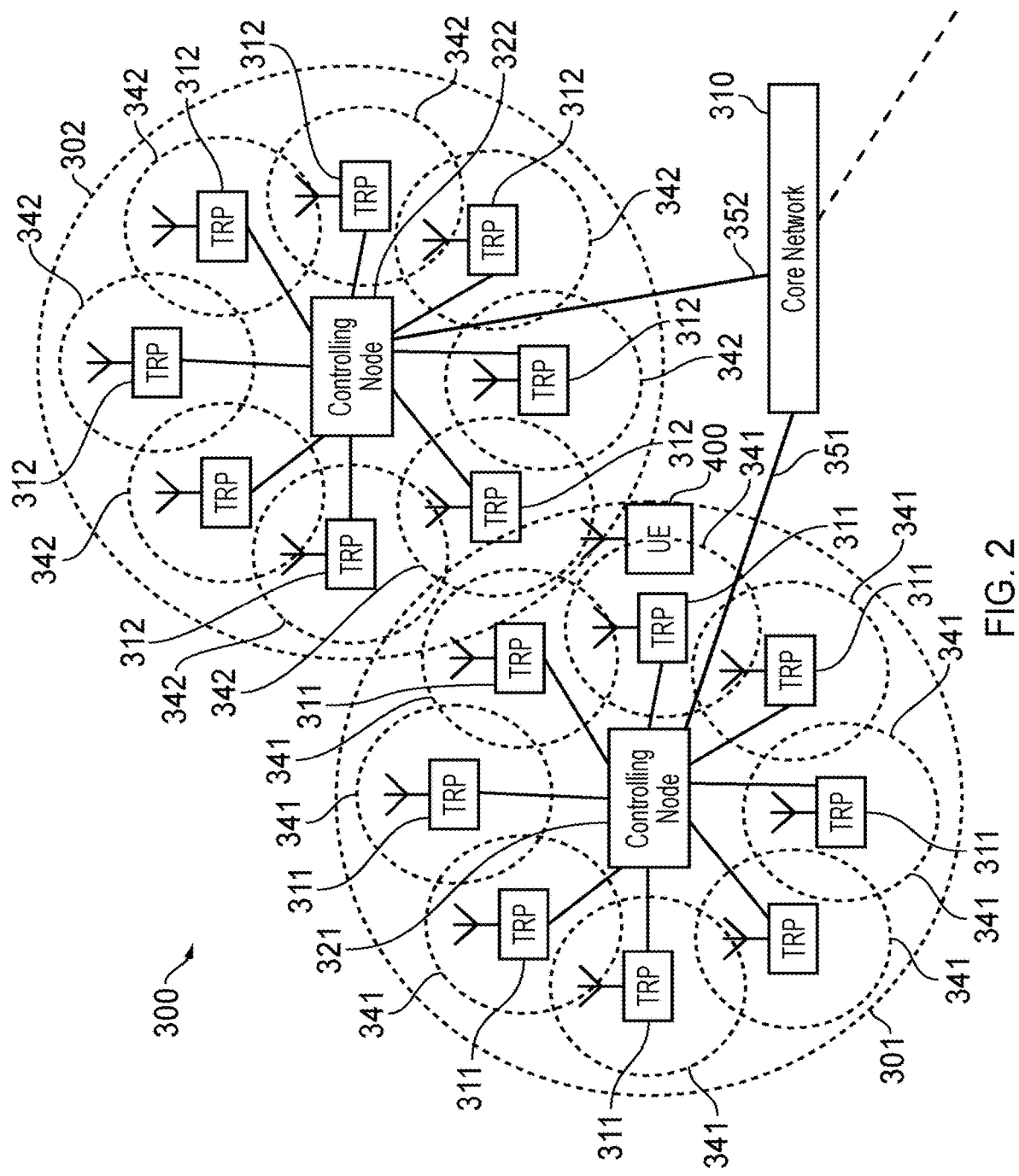
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 300 based on previously proposed approaches which may also be adapted to provide functionality in accordance with embodiments of the disclosure described herein, and which may again include one or more NTN components providing radio access through a non-terrestrial node. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for terminal devices connected to the network, and as noted above some of these may be non-terrestrial in a network having an NTN part. Each distributed unit 311, 312 has a coverage area (radio access footprint) 341, 342 which together define the coverage of the respective communication cells 301, 302. Each distributed unit 311, 312 includes transceiver circuitry 311a, 312a for transmission and reception of wireless signals and processor circuitry 311a, 311b configured to control the respective distributed units 311, 312.

In terms of broad top-level functionality, the core network component 310 of the telecommunications system represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. In some cases communications for a given terminal device are routed through only one of the distributed units, but it will be appreciated in some other implementations communications associated with a given terminal device may be routed through more than one distributed unit, for example in a soft handover scenario and other scenarios. The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 400. That is to say, in some cases the terminal device may not be aware of which distributed unit is responsible for routing communications between the terminal device 400 and the controlling node 321 of the communication cell 301 in which the terminal device is currently operating. In such cases, as far as the terminal device is concerned, it simply transmits uplink data to the controlling node 321 and receives downlink data from the controlling node 321 and the terminal device has no awareness of the involvement of the distributed units 311. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes, including NTN infrastructure equipment/access nodes, and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment may comprise a control unit/controlling node 321, 322 and/or a TRP 311, 312 of the kind shown in FIG. 2 which is adapted to provide functionality in accordance with the principles described herein.

Figure 3:
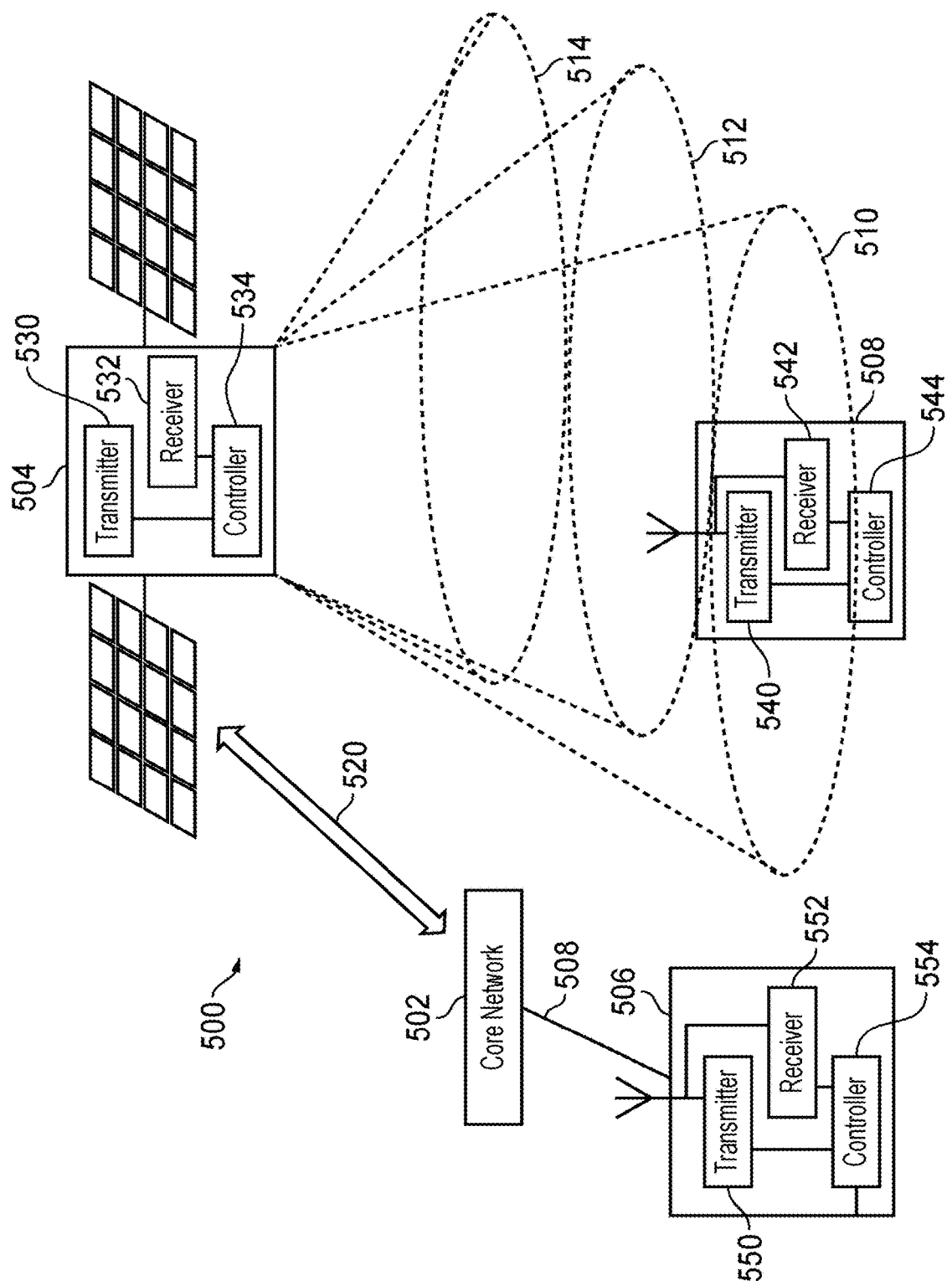
FIG. 3 schematically represents some aspects of a wireless telecommunication system in accordance with certain embodiments of the present disclosure.

FIG. 3 schematically shows some aspects of a telecommunications system 500 configured to support communications between a terminal device 508 and network access nodes 504, 506 in accordance with certain embodiments of the disclosure. One network access node is a terrestrial network access node 506 and one network access node is a non-terrestrial network access node 504, in this example an orbital satellite based terrestrial network access node. Many aspects of the operation of the telecommunications system/network 500 are known and understood and are not described here in detail in the interest of brevity. Aspects of the architecture and operation of the telecommunications system 500 which are not specifically described herein may be implemented in accordance with any previously proposed techniques, for example according to current 3GPP standards and other proposals for operating wireless telecommunications systems/networks. The network access nodes 504, 506 may, for convenience, sometimes be referred to herein as base stations 504, 506, it being understood this term is used for simplicity and is not intended to imply any network access node should conform to any specific network architecture or should be terrestrial, but on the contrary, may correspond with any network infrastructure equipment/network access node that may be configured to provide functionality as described herein. In that sense it will appreciated the specific network architecture in which embodiments of the disclosure may be implemented is not of primary significance to the principles described herein.

The telecommunications system 500 comprises a core network part 502 coupled to a radio network part. The radio network part comprises the radio network access nodes 504, 506 and the terminal device 508. It will of course be appreciated that in practice the radio network part may comprise a more than two network access nodes serving multiple terminal devices across various communication cells/spot-beams. However, only two network access nodes and one terminal device are shown in FIG. 3 in the interests of simplicity.

The terminal device 508 is arranged to communicate data to and from the network access nodes (base stations/transceiver stations) 504, 506 according to coverage. For the example shown in FIG. 3 it is assumed the terminal device 508 is currently within the coverage area/spot-beam 510 of the NTN radio access node 504. Typically the terminal device will be operable to connect to (i.e. be able to exchange user plane data with) one network infrastructure element at a time, and so as the terminal device moves around the network it may move in and out of coverage of the different network access nodes comprising the network. A particular issue with NTN radio access nodes is that the coverage area/spot-beam can itself move rapidly across the earth's surface so that a terminal device may move in and out of the coverage area of an NTN radio access nodes relatively quickly, even when the terminal device itself may be stationary.

The network access nodes 504, 506, are communicatively connected to a core network part which is arranged to perform routing and management of mobile communications services to the terminal devices in the telecommunications system 500 via the network access nodes 504, 506. The connection from the NTN network access nodes 504 to the core network 502 is wireless while the connection from the terrestrial network access node 506 to the core network 502 may be wired or wireless. In order to maintain mobility management and connectivity, the core network part 502 also includes a mobility management entity, MME, 520 which manages the service, connections with terminal devices operating in the communications system. As noted above, the operation of the various elements of the communications system 500 shown in FIG. 3 may be in accordance with known techniques apart from where modified to provide functionality in accordance with embodiments of the present disclosure as discussed herein.

The terminal device 508 is adapted to support operations in accordance with embodiments of the present disclosure when communicating with the network access nodes 504, 506. The terminal device 508 comprises transmitter circuitry 540 for transmission of wireless signals, receiver circuitry 542 and controller or processor circuitry 544 (which may also be referred to as a processor/processor unit) configured to control the terminal device 508. The processor circuitry 544 may comprise various sub-units/sub-circuits for providing desired functionality as explained further herein. These sub-units may be implemented as discrete hardware elements or as appropriately configured functions of the processor circuitry. Thus the processor circuitry 544 may comprise circuitry which is suitably configured/programmed to provide the desired functionality described herein using conventional programming/configuration techniques for equipment in wireless telecommunications systems. The transmitter and receiver circuitry 340, 542 and the processor circuitry 544 are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 508 will in general comprise various other elements associated with its operating functionality, for example a power source, user interface, and so forth, but these are not shown in FIG. 3 in the interests of simplicity.

The network access nodes 504, 506 each comprises transmitter circuitry 530, 550 (which may also be referred to as a transceiver/transceiver unit) for transmission of wireless signals, receiver circuitry 532, 552 for receiving wireless signals and controller or processor circuitry 534, 554 (which may also be referred to as a processor/processor unit) configured to control the respective network access nodes 504, 506 to operate in accordance with embodiments of the present disclosure as described herein. Thus, the processor circuitry 534, 554 for each network access node 504, 506 may comprise circuitry which is suitably configured/programmed to provide the desired functionality described herein using conventional programming/configuration techniques for equipment in wireless telecommunications systems. For each network access nodes 504, 506 the transmitter and receiver circuitry 530, 532, 550, 552 and the processor circuitry 534, 554 are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated that each of the network access nodes 504, 506 will in general comprise various other elements associated with its operating functionality, such as a scheduler. For example, although not shown in FIG. 3 for simplicity, the processor circuitry 534, 554 may comprise scheduling circuitry, that is to say the processor circuitry 534, 554 may be configured/programmed to provide the scheduling function for the network access node.

Thus, some networks may include non-terrestrial network (NTN) parts which may either be fully integrated with a terrestrial network, as in the example of FIG. 3, or may operate as a stand-alone non-terrestrial-network.

The NTN network may be associated with a number of different platforms having different characteristics. Some proposals for NTN are indicated in the following table:

| Platform | Altitude range (km) | Orbit Shape | Beam footprint diameter (km) |
| --- | --- | --- | --- |
| Low-Earth Orbit (LEO) satellite | 300-1500 | Circular around Earth | 100-500 |
| Medium-Earth Orbit (MEO) satellite | 7000-25000 | | 100-500 |
| Geostationary Earth Orbit (GEO) satellite | 35786 | Notionally stationary at fixed position in terms of elevation/azimuth with respect to a given location on Earth | 200-1000 |
| UAS (unmanned aircraft system) platform (including HAPS - high altitude pseudo-satellite). May also be referred to as a Drone platform. | 8-50 (20 HAPS) | | 5-200 |
| High Elliptical Orbit (HEO) satellite | 400-50000 | Elliptical around Earth | 200-1000 |

In terms of mobility management, NTNs based on GEO-satellite and UAS/HAPS platforms are similar to terrestrial networks in that the cells (base stations) are notionally stationary and it is movement of terminal devices relative to the cells that gives rise to mobility within the network. This means mobility management procedures for such NTN network access nodes can, in essence, be implemented in the same manner as for terrestrial networks (potentially taking account of differences in signal propagation time as appropriate).

However for non-geostationary NTN platforms, e.g. LEO, MEO and HEO satellite platforms, the satellite (i.e. the base station/NTN radio access node) moves with respect to the earth, and so its coverage/spot-beam(s) also moves across the surface of the earth, typically relatively quickly. This means that whereas for a stationary cell (e.g. terrestrial base station or GEO satellite base station) the terminal device's movement relative to earth is what gives rise to mobility (ignoring changing radio channel conditions), for non-geostationary NTN platforms, terminal device mobility within the network is typically exceeded by the movement of the base station/satellite itself since the coverage footprint of non-geostationary NTN platforms will typically be moving across the earth significantly faster than terminal devices.

Due to the movement of non-geostationary based NTN platform spot-beam footprints across the earth, ubiquitous coverage may be provided by constellations of satellites. Thus for a given location of a terminal device on the earth surface, as one satellite moves along its orbit, the location may be illuminated by a spot-beam of the satellite for a time until that spot-beam footprint moves away from that location. Then the next spot-beam, possibly from the same satellite, takes over coverage (illumination) of the location until its illumination in turn drifts away from the location, and so on. Thus different spot-beams from different satellites provide coverage for a given location on the earth at different times.

LEO satellites at the highest orbital altitude in the table above might have an orbital speed of around 7 km/s and a spot-beam coverage of around 500 km. This means the satellite may move a linear distance corresponding to the diameter of its spot-beam footprint in little more than a minute (around 70 seconds). This means even a stationary terminal device may need to be handed over from one spot-beam 510, 512, 514 to the next every minute or so for LEO satellites at the highest orbital altitude, and potentially more often still for lower altitude LEO satellites which will move faster and typically have smaller diameter spot-beams.

As is well understood, wireless telecommunications networks may support different Radio Resource Control (RRC) modes for terminal devices, typically including: (i) RRC idle mode (RRC_IDLE); and (ii) RRC connected mode (RRC_CONNECTED). A terminal device typically transmits data whilst in RRC connected mode. The RRC idle mode, on the other hand, is used for terminal devices which are registered to the network (EMM-REGISTERED), but not currently in active communication (ECM-IDLE). Thus, generally speaking, in RRC connected mode a terminal device is connected to a radio network access node (e.g. base station, which may be a non-terrestrial radio access node in a NTN) in the sense of being able to exchange user plane data with the radio network access node. Conversely, in RRC idle mode a terminal device is not connected to a radio network access node in the sense of not being able to communicate user plane data using the radio network access node. The RRC connection setup procedure of going from RRC idle mode to RRC connected mode may be referred to as connecting to a cell/base station and entails the terminal device undertaking a RACH (random access channel) procedure, security activation procedure, RRC connection establishment procedure etc., which takes time to complete and consumes transmission resources in the network and power by the terminal device. In addition to these idle and connected modes there are also proposals for other RRC modes, such as the so-called RRC_INACTIVE mode. A terminal device in RRC_INACTIVE mode is one which is not in an active RRC connected mode with the radio access network (RAN), but is considered to be connected from a CN (core network) point of view, so that data can be sent without CN-level paging, but with paging performed instead at the RAN level, to cause/trigger the terminal device to resume RRC connection (e.g. enter an RRC connected mode) if necessary.

An advantage of the non-connected modes (RRC_IDLE and RRC_INACTIVE), is that they can be used to help a terminal device save power, but the terminal devices may not be able to take full advantage of this if it needs to transition to connected mode to transmit a location report too frequently.

As noted above, for a NGSO non-geostationary orbit) platform in an NTN, the movement that dominates the need for mobility management is expected to be that of the satellite rather than the terminal devices. That is to say, it may be expected a terminal device is relatively stationary when compared to the movement of spot-beams/cells of the satellites providing the terminal device with coverage. For example, a proposal requirement for NR telecommunication systems is to support a terminal device speed of up to 500 km/h (around 0.14 km/s), which is significantly less than the orbital speed of LEO satellites which is typically more than 7 km/s.

It is known generally that mobile communications systems provide an arrangement for adapting the signal coding and modulation of transmitter and receiver chain of circuits for communicating data in accordance with dynamically changing radio conditions. Such techniques, which are referred to as link adaptation, typically involve adapting, for example, a size of a modulation scheme used to map the data for transmission on to carriers/sub-carriers (mQAM etc) as well as a coding rate of an error correction encoding used to transmit and receive the data to improve integrity with respect to communications resources consumed. In similar systems, link adaptation adapts communications parameters of the transmitted data in accordance with both radio propagation conditions and a currently experienced interference from other cells transmitting on the same frequency and time. Link adaptation is performed in order to improve an efficiency with which radio communications resources are used within mobile communications systems.

Link adaptation also facilitates support of varying traffic demands whilst taking UE mobility into account. In order to make link adaptation most effective, a minimal response time in respect of the access control functionality is required in order to perform the link adaptation with respect to the dynamically changing communications conditions. In similar systems access control is typically located in a base station such as a g-NodeB which is relatively close to the UE compared with an NTN base station. Moreover, with terrestrial systems coordination between gNBs is possible through the XN interface (an interface between gNB's) or via a central entity. For satellite systems however, access control is mostly located at a satellite base station, gateway or hub level for which feedback required for link adaptation takes a longer time because of the propagation delay. This may prevent optimal or at least an effective response time for access control and link adaptation. This is because the round trip delay for communications for satellite base stations is typically much longer than those for conventional terrestrial radio base stations. For this reason pre-grant of communications resources, semi-persistent scheduling of communications resources to UE's and/or grant free access schemes can provide an advantage in which there is a reduced requirement for an exchange of signalling messages such as access requests and resource allocation responses to allow UEs to access communications resources.

In 3GPP release 15 standard relating to new radio or 5G, provides for semi-persistent scheduling of downlink resources. The uplink is configured differently but semi-persistent scheduling of uplink resources is supported for static scheduling grant parameters. Static parameter configuration in which the communications parameters for the transmitter and receiver chain are established on a fixed basis is reasonable for conventional (terrestrial) communications because a path loss of the radio communications path or the channel quality typically does not vary rapidly. However as indicated above for low orbit satellites, a satellite may move 450 km in its orbit during 1 minute. With a low earth orbit satellite altitude of 600 km a difference in propagation distance over a single minute is therefore significant. As a result a propagation path loss as well as other radio conditions may change significantly during a communications session.

As indicated above, because of the changing propagation conditions and radio communication conditions some form of link adaptation is appropriate in order to communicate data efficiently from a UE to a satellite base station as well as from the satellite base station to the UE. Conventionally link adaptation is based on performing RRC signalling in order to establish a radio bearer between the UE and the satellite base station and then providing channel state information and link quality information from the UE to the base station and vice versa in order to adapt the communications parameters used for transmitting data. However, as a result of a delay in transmitting and receiving signals between the UE and the satellite base station and the absence of channel state information, which can be provided by a non-terrestrial node (NTN) base station, performing link adaption presents a technical problem.

Embodiments of the present technique provide an arrangement in which a UE is configured to predict a state of a radio communications channel for transmitting signals from the UE to the NTN base station in order to perform an adaptation of communications parameters in accordance with a link adaptation procedure. According to the modelling performed by the UE, the UE predicts a required signal to interference and noise ratio (SINR) at the NTN base station using an internal model. The model may require signal strength (pathloss) prediction, a prediction of noise and interference as well as other parameters. Whilst this prediction may have some errors, other techniques can be used to compensate for these errors.

Embodiments of the present technique also provide an arrangement in which RRC parameters which are parameters of a radio bearer established between the UE and the NTN base station are arranged to change infrequently. As such, the RRC parameters may be semi-statically configured rather than dynamically configured based on an initial set of communications parameters. The initial communications parameters are used by a model in the UE to generate adapted communications parameters which are changed dynamically from the initial set of parameters.

A further technical problem addressed by embodiments of the present technique is to provide an arrangement in which detailed link adaptation parameters such as communications parameters are not transmitted from the UE to the NTN base station because a wireless access interface between the UE and the NTN base station does not provide capacity for transmitting these adapted communications parameters on an uplink control information indicator. Typical link adaptation parameters include a transport block size, a modulation scheme and a coding scheme. According to example embodiments, the adapted communications parameters are not fed back to the NTN base station on an uplink control information (UCI) message on layer 1 as would be done conventionally for a terrestrial base station for example via a physical uplink control channel (PUCCH).

Embodiments of the present technique can provide an arrangement in which a UE dynamically changes communications parameters with reduced RRC signalling and without a real time base station providing feedback on downlink control channel during uplink configured grant sessions. According to an example embodiment a UE receives an initial set of parameters from a NTN base station and then internally generates a model and predicts a channel state based for example on path loss between the UE and the NTN base station. The UE then estimates communications parameters with a predicted channel state and a required signal to noise and interference ratio at the NTN base station. In one example, the NTN base station may also generate the same model and therefore based on the initial parameters which both the NTN base station and the UE know, the NTN base station may select communications parameters in accordance with link adaption parameters in order to adapt the communications parameters of the transmitter and receiver chain from the UE to the NTN base station. The UE then transmits data using the selected link adaptation parameters without necessarily providing an indication to the base station of the communications parameters which have been selected. The NTN base station detects the signal transmitted from the UE to estimate the data using either a blind detection technique or using a corresponding prediction and link adaptation model which is being performed at the NTN base station.

Referring again to FIG. 3, a UE 508 is shown to communicate with a NTN base station 504 via one or more spot beams 510, 512, 514. A backhaul communication channel to the core network 502 is shown via a communications interface 520. As already explained a conventional terrestrial base station 506 is shown connected to the core network part 502 via an interface 508.

Embodiments of the present technique can provide an arrangement for efficiently communicating data from a UE 508 to an NTN base station 504 via one of the spot beams 510, 512, 514. As shown in FIG. 3, the UE 508 is currently located within a spot beam 510 within which radio signals are transmitted and received between the UE 508 and the NTN base station 504.

As explained above, on an uplink, the transmitter 540 of the UE 508 is configured to adapt communications parameters in accordance with a link adaptation procedure to match the radio conditions experienced for radio communications within the beam 510 and a receiver 532 of the NTN base station 504. Correspondingly, link adaptation can be performed by a transmitter 530 for radio signals transmitted from the NTN base station 504 to the UE 508 and received by the receiver 542, the link adaptation procedure adapting communications parameters for the transmitter 530 and the receiver 542.

As will be appreciated the model of the channel state may include the link adaptation procedure, because this may form an integral part of assessing the channel, or the link adaptation procedure may form a separate process from the model of the channel state which may therefore communicate an indication of the channel state via an interface.

The following embodiments of the present technique will be described with reference to the operation of the UE 508 in respect of uplink data transmissions from the UE 508 to the NTN base stations 504. However it will be appreciated that in other embodiments the present technique can be applied equally to downlink communications that is performed by the controller 534 of the NTN base station 504 for transmission of data for reception by the UE 508 by the receiver 542.

Figure 4:
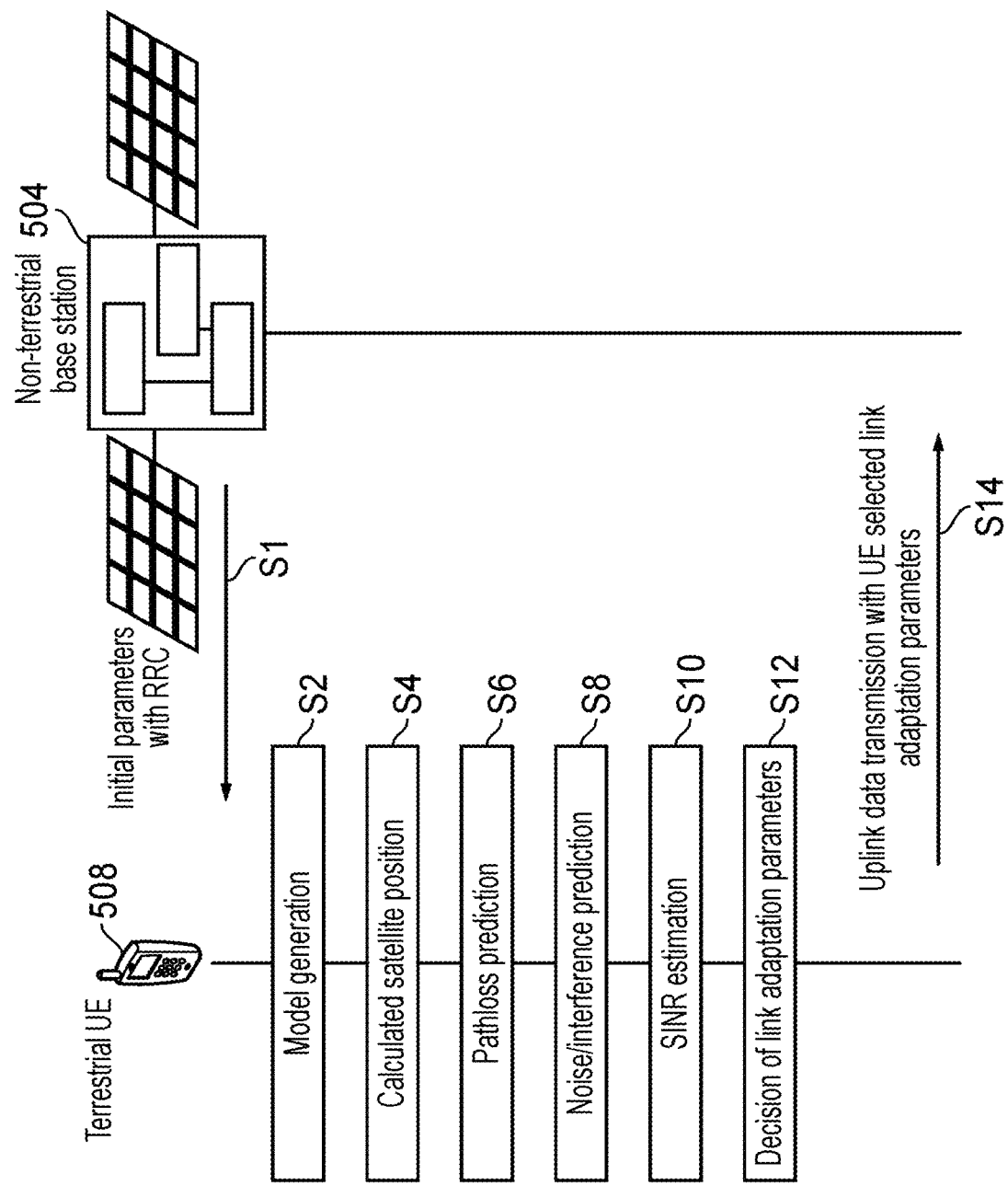
FIG. 4 is a flow diagram providing a first illustration of an embodiment of the present technique.

An embodiment of the present technique is illustrated by the flow diagram shown in FIG. 4. It will be appreciated that the process steps shown in FIG. 4 are performed generally by the controller 544 in combination with its control of the transmitter and the receiver 542.

As shown in FIG. 4 in first step S1 the NTN base station 504 transmits an initial set of communications parameters with RRC signal which is performed for example when a communications bearer is established by the radio link layer from the UE 508 to the NTN base station 504.

After receiving the initial parameters from the NTN base station, the controller 544 of the UE 508 generates a model for calculating a channel state between the UE 508 and the NTN base station 504. In step S4, the controller 544 estimates a position of the NTN base station and predicts based on its own position and therefore a relative distance between the UE 508 and the NTN base station 504 a path loss and result of radio communications based on the initial parameters provided in the RRC signalling and other internal parameters. For example the RRC signalling may establish an absolute radio frequency number used by the UE 508 which can be used to predict the path loss between the UE 508 and the NTN base station 504 for the calculated distance. Thus in step S6 the controller 544 predicts a path loss between the UE and the NTN base station 504. In step S8 the controller 544 predicts a noise and interference with which signals will be received at the NTN base station based on the initial parameters and historical data such as a previous indication of interference at the NTN base station. In step S10 the controller 544 predicts a signal to interference and noise ratio at the receiver 542 within the NTN base station 504 and in accordance with the predicted path loss and the predicted signal to interference and noise ratio the controller selects new communications parameters in accordance with a link adaptation procedure for the transmission of the uplink data.

In step S12 from the predicted communications parameters in accordance with the link adaptation procedure, the controller 544 controls the transmitter 540 to select a transport format comprising communications parameters and reapplies the communications parameters to transmit data to the NTN base station 504. The transmission of the data is represented by the arrow S14. The receiver 532 detects the radio signals transmitted on the uplink by the UE 508 and generates an estimate of the data carried by those signals by decoding the data in accordance with the communications parameters used by the UE 508 which is without an explicit indication of those communications parameters. This can be performed by the controller 534 generating within the NTN base station 504 a corresponding prediction of the model performed by the controller 544 within the UE 508. Alternatively the receiver 532 can perform a blind detection of the data and blind decoding to recover an estimate of the data.

Figure 5:
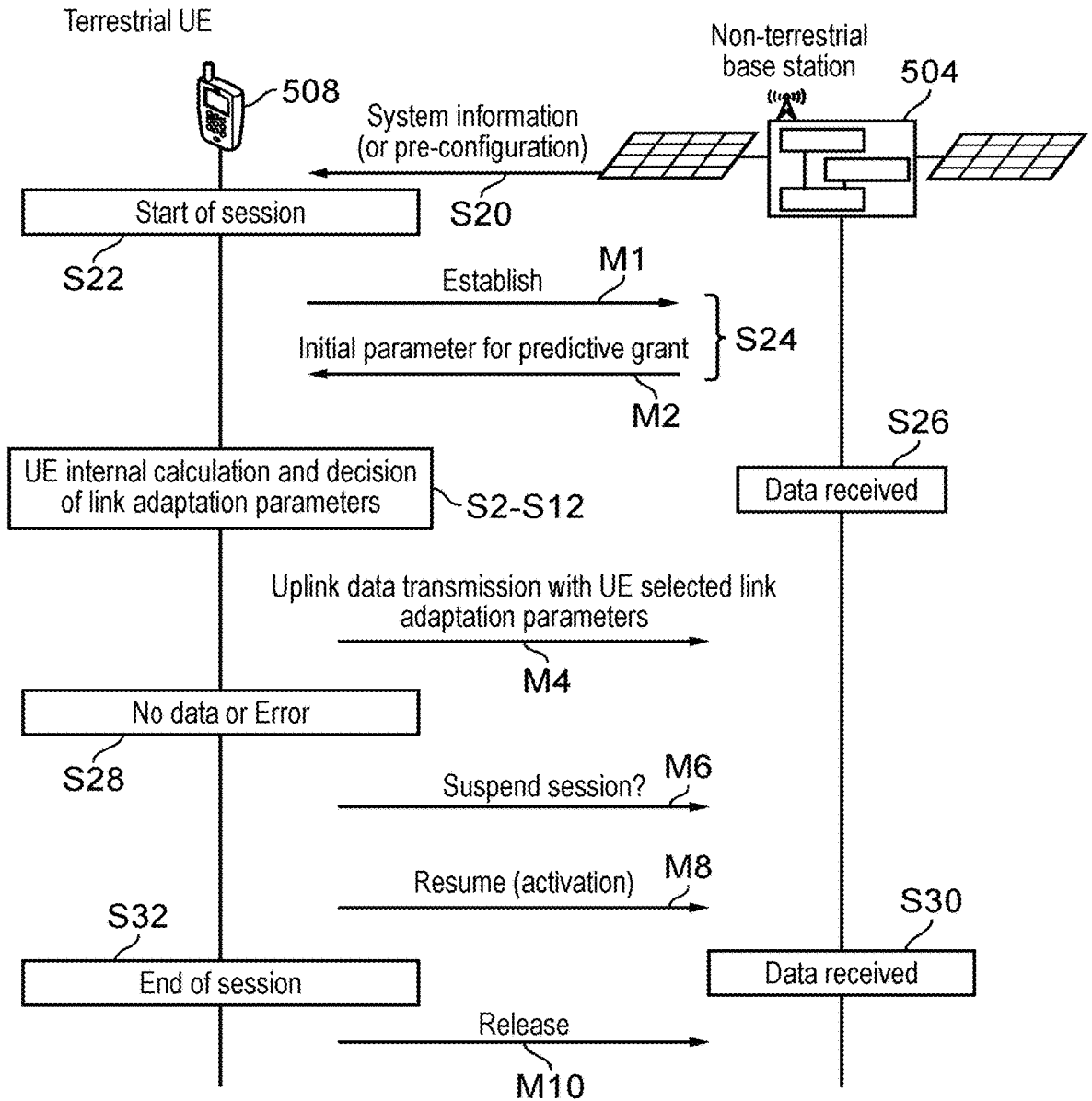
FIG. 5 is a flow diagram providing a first illustration of an embodiment of the present technique.

FIG. 5 provides a more detailed example of a general sequence in accordance with a process of the link adaptation as represented in FIG. 4 where the communications parameters required for link adaptation are predicted. As shown in FIG. 5, as a first step S20, the NTN base station 504 transmits system information in accordance with a conventional arrangement which is detected by the UE 508. However in accordance with example embodiments a pre-configuration of communications parameters is provided with the system information which corresponds approximately to step S1 shown in FIG. 4. In other examples a sim card of the UE 508 may provide the preconfigured communications parameters or these may be provided in advance for example via an internet connection.

In step S22, a communications session starts. The UE 508 then initiates the communications session by a request received from an application layer programme. As shown by a message exchange S24, the UE establishes via RRC signalling initial parameters for predicted grant of resources for communications parameters which are identified in more detail below. The NTN base station 504 then replies with a message M2 providing initial parameters for the predicted grant of uplink communications resources. It then follows a process of predicting the adaptation of the communications parameters as represented by FIG. 4 in steps S2-S12 in which the data is transmitted and received at the NTN base station 504 as represented by a process at step S26. Accordingly during the process steps S2-S12, the UE calculates the path loss and signal to interference and noise ratio with a model as explained above and generates adapted communications parameters. The UE decides the communications parameters in accordance with a link adaptation procedure. Examples of these communications parameters are shown below. The UE then transmits the data using the selected communications parameters chosen using the link adaptation procedure as represented by an arrow M4.

If the data is transmitted and received correctly and without error then the UE proceeds to transmit all of the data in its buffer using the newly adapted communications parameters as represented by step S28. In one example the decoding of the data present in the UEs buffer is triggered by an ACK transmitted from the network, such as that used as part of an ARQ protocol. If however the UE decides that the session should be suspended as a result of a predicted poor link quality and the semi-persistent resources are temporally not used by the UE then a message M6 is sent to the NTN base station 504. Correspondingly the UE may send an activation of a semi-persistent session if a problem which caused the session to be suspended has been resolved using a message M8. Accordingly data is received again as represented by step S30. Once the UE 508 has transmitted all of the uplink data then the resources are released and the session ends as represented by step S32 and a release message is sent to NTN base station 504 M10.

As explained above, in step S24 and the message exchange M1, M2 between the NTN base station 504 and the UE 508 initial communications parameters are communicated from the NTN base station to the UE 508, for example as part of RRC radio bearer establishment. An example of these initial communications parameters are:

Satellite
  Satellite type/ID
  orbit (almanacs and ephemerides)
  attenuation due to atmospheric gasses
  attenuation due to either ionospheric or tropospheric scintillation
  attenuation due to weather conditions (e.g. rain)
  noise due to solar condition (e.g. solar storm)
Surrounding environment
  attenuation due to penetration loss (if not line of site), UE may use the geo-location database/indoor positioning.
  multipath effect (interference with ground reflection), UE may use the geo-location database and possible effect (on the concrete ground, on the sea)
  fading margin (e.g. indoor or outdoor)
  mobility type (e.g. stationary, ship or airplane), UE may measure the speed or altitude by GNSS or own inertia sensors. Or the location server may have the type of UE and indicate it UE.
  interference due to man-made noise (e.g. urban area, close to radar) and so on As explained above, according to example embodiments, the controller 544 of the UE 508 models a state of the radio communications channel between the UE 508 to the NTN satellite 504 to adapt the communications parameters in accordance with a link adaptation procedure. As explained the UE receives the initial communications parameters as explained above, for example, from the RRC radio bearer establishment (for example assistance information of satellite orbit, propagation related attributes). The controller 544 of the UE 508 also uses internal parameters such as a current time/date and its current UE position and a prediction of a position of the NTN base station 504 (step S4 in FIG. 4), based, for example on an orbit of a satellite or the flight plan of a drone, depending on the nature of the NTN base station 504.

Based on it, UE predicts the path loss (step S6 of FIG. 4) and the noise and interference (step S8 of FIG. 4) separately. According to the model determined by the controller 544 of the UE 508, the UE calculates an estimate of the signal to interference and noise ratio of signals received at the NTN base station 504, which is applied to for example a lookup table to determine a set of communications parameters for transmitting data in accordance with a link adaptation procedure.

As will be appreciated from the above explanation, the controller 534 of the NTN base station 504 could also estimate the signal to interference and noise ratio of signals transmitted by the UE 508 and received at the NTN base station 504 to identify the communications parameters being applied by the UE 508.

According to one example embodiment, the model generated by the UE 504 determines the path loss in step S4 of FIG. 4 using factors such as:
  Distance between UE and a base station (basis of path-loss)
  Atmospheric effects for electromagnetic waves such as reflection, absorb.
  UE use environments such as building penetration loss, clutter type (e.g. urban, rural, sea)

In one example, the model applied by the UE 508 calculates the path loss (PL) as follows:

$$PL = PL_b + PL_g + PL_s + PL_e,$$

where PL is the total path loss in dB, $PL_b$ is the basic path (free space) loss in dB, calculated based on the distance $PL_g$ is the attenuation due to atmospheric gasses in dB, provided by assistance information $PL_s$ is the attenuation due to either ionospheric or tropospheric scintillation in dB, by assistance information $PL_e$ is building entry loss in dB, which could be determined by the geo-location database. The PLg and the PLs could be provided by system information transmitted by the NTN base station 504 if it holds a GIS database which incorporates these parameters. The free space loss can be calculated by a formular $PL_b = (4\pi df/c)^2$. The model may also include a building penetration, which can be sensed by the UE. In some examples, the factors $PL_g$ and $PL_s$ could be communicated as part of the initial parameters as a combined attenuation value to reduce signalling.

Accordingly the UE can calculate the path loss as part of the model in accordance with the following as represented in FIG. 4:
1. The UE receives the initial parameters;
2. The UE calculates the estimated satellite position based on the orbit calculation;
3. The UE calculates the distance between its own position and the estimated satellite position at the time of its next transmission;
4. The UE converts the distance to a path loss based on the above formula.

As explained above, according to the example embodiment presented in FIG. 4, in step S8 the model generated by the UE 508 calculates the signal to interference and noise ratio using such factors as:
  External disturbance such as solar storm, man-made noise
  Use environments such as mobility speed, multi-path effects, interference from other cell/other UEs.

According to one example, the model may receive as part of the initial parameters an indication of a current noise and interference power detected at the NTN base station 504 and then adjusts this initial indication in accordance with some error factor or time/distance varying property for more accuracy based on feedback loop during the communication. For example the interference and noise (NI) may be assumed to be composed of the components:

$$NI = Ne(\text{external noise}) + Ni(\text{internal noise}) + No(\text{unorthogonal interference factor})$$

In the above equation:
NI is the total noise in dB, Ne is the external noise in dB such as other that produced by other UE interference such as man-made noise. According to one example, the NTN base station 504 could measure the noise and interference as part of a received signal strength indication (RSSI) when received signals are low as a result of low traffic or during a dedicated time slot for measurement. This value could be transmitted with the broadcast system information from the NTN base station 504 to the UE 508.

Ni is the internal noise in dB such as a noise figure for a low noise amplifier and feeder loss, which the NTN base station 504 could determine from an initial factory setting or a setup measurement. Thermal noise (kTB) depends on the temperature and so needs to be measured at the UE. This Ni value could be provided by with the system information or as assistance information as some other message exchange. In above, k is Boltzmann's constant, T is absolute temperature, B is the NTN base station transponder receiver bandwidth.

No is the interference in dB such as un-orthogonal factor or multipath effect, which may use the historical value based on geo-location. Perhaps, negligible for uplink.

For simplification and reduction in signalling overhead, some noise parameters could be merged into a consolidated value, which could provide an indication for a lookup table present in the UE 508.

Accordingly the UE can predict the noise and interference at the receiver 532 in the NTN base station 504 as part of the model in accordance with the following as represented by step S8 in FIG. 4:

1. The UE receives initial information as part of the initial communications parameters (step S1 or S24).
2. The UE calculates the estimated noise and interference based on these communications parameters, which may include some error. For example, as explained above these could be calculated according to the above formula NI=Ne(external noise)+Ni (internal noise)+No (unorthogonal interference factor) or, more simply, a base station may send the RSSI to the UE, which the UE may use as an approximate value.
3. The controller 544 of the UE 508 may be configured as part of the model to accumulate a history of error detection results, for example an indication of a number of errors can be made based on a ratio of NACK/(ACK+NACK) from a base station received from the NTN base station 504 as part of a Hybrid ARQ communication scheme. It should be noted however that in some example applications such as where the NTN base station is located in a satellite a long round trip delay for transmission be make HARQ unfeasible to use and so may be suspended.
4. If the number of detection errors is
    a. higher than expected
        i. the UE can increase the internal variables of estimated noise/interference.
    b. lower than expected
        i. the UE can decrease the internal variables of estimated noise/interference.
    c. almost equal to that expected
        i. (current model looks accurate)
            UE keeps the current value of the internal variables of estimated noise/interference.
5. The UE stores the internal variables of estimated noise/interference for its next transmission.
6. Optionally, at the end of a session or during a session, the UE may send a compensated value of noise and interference (NI) to the NTN base station 504. The NTN base station 504 could use it for calibration of its own initial parameters.
7. If the UE faces a still higher error rate after the UE has changed the internal variables of estimated noise/interference or the UE can receive neither ACK nor NACK, then the UE deactivates the persistent scheduling or reverts to radio link failure (RLF) procedure as represented as step S28 and messages M6, M8 explained above.

As explained, the UE obtains the parameters for the calculation of the noise and interference from one or more of:

RRC dedicated signalling, such as for example semi-persistence signalling configuration;
System information, such as System information Blocks broadcast by the NTN base station;
Assistance information transmitted by a satellite such as assisted GPS, assistance information communication like Internet/Wifi, SIB by cellular network etc.

Geo-location database, which may be pre-configuration at UE or downloaded via Internet.

As indicated above, in some examples the controller 534 in the NTN base station 504 may also generate the same model to mimic the operation of the controller 544 in the UE 508 to generate an estimate of the communications parameters used to transmit the data from the UE 508 in accordance with the link adaptation procedure. This is because current versions of 3GPP standards such as release-15 do not provide for communications resources to transmit uplink control information (UCI) on physical uplink channels such as a PUCCH/PUSCH to send the selected link adaptation parameters to the NTN base station 504. For this reason the NTN base station 504 is configured to arrange for the receiver 532 to detect the radio signals transmitted from the UE 508 and to decode the uplink data without an explicit indication of the communications parameters used to transmit the uplink data.

An example link adaptation procedure adapts for example the transmission power to ensure that a target signal to noise and interference ration (SNIR) is achieved whilst maintaining others of the communications parameters such as modulation index and error correction coding rate the same. For this example, the NTN base station 504 does not require any adaptation of the other communications parameters to detect and estimate the uplink data with respect to these communications parameters (other than the communications parameters of transmission power) established at the start of the session for example with the RRC radio bearer configuration. A restriction on the application of this link adaptation technique may be that the transmitter does not have enough power headroom for increasing the transmission power. However increasing the transmission power beyond a certain limit may not increase an integrity of the communicated data beyond a certain limit and therefore a rate of data transmission above a certain transmission power. As such when higher than available transmission powers are required, it may be appropriate to adapt other communications parameters such as the modulation index and error correction encoding rate.

As indicated above there are two techniques for detecting radio signals transmitted by a UE according to example embodiments in which link adaptation is applied by the UE based on modelling the channel state as explained above. The first technique is to configure the controller 544 to model the channel state to reflect the model performed at the UE. The second is to perform a blind detection of the radio signals and to generate an estimate of the data carried by the radio signals using all possible permutations of the communications parameters other than the transmission power.

The first technique assumes that both the transmitter (UE) and receiver (NTN base station) has identical calculation models for estimating the channel state. Instead of power control, the UE applies the estimated channel state to select a suitable modulation and coding (MCS) and/or transport block size with the same output of the model.

The challenge with this first technique is for the base station to detect and to decode the data without knowing the transmission buffer status or a block size used by the transmitter at the receiver. In one embodiment, a static block size is used so that the receiver can assume the same data size for next transmission. That is to say, the transmitter in the UE is configured to use the same transport block size indicated as part of the initial parameters and is either fixed for the duration of the communications session or varied by a predetermined amount for conditions that can be identified by each of the transmitter (UE) and the receiver (NTN base station). For example a transport block size can be mapped on to a certain selected modulation scheme and error correction encoding rate. Optionally, in order to provide more flexibility for the grant of communications resources, the UE may send the buffer status and/or power headroom to the NTN base station.

As mentioned above, the second detection technique applied at the receiver (NTN base station) is blind detection in which, for example, the receiver tries all combinations of the communications parameters (other than transmission power) to detect and to decode the uplink data. There are various ways of blind detection at the receiver such as energy detection, or CRC detection. In one example embodiment, the link adaptation procedure restricts a number of combinations of the communications parameters (other than transmission power) at the transmitter (UE) so that the number of possible combinations of the communications parameters which are needed to perform the blind detection can also be reduced. For example, the number of possible combinations for communications parameters for link adaptation can be reduced to for example to two or three possible combinations of parameters, for example, by fixing a modulation scheme (constellation size) with limited transport block size combination. Furthermore an increase of the CRC size can be used, for example 24 bits or more in order to avoid misdetection.

As a hybrid method a link adaptation procedure could switch between different techniques, such as power adaptation only until a maximum power has been reached in which case both the transmitter and the receiver switch to a different and fixed modulation and coding rate and then adapt the transmission power again until the maximum transmission power is reached.

According to some embodiments either the transmitter (UE) or the receiver (NTN base station) can detect conditions which abort the link adaptation procedure and so fall back to a conservative scheduling position. For example, if the controller detects using the model of the channel state, that the channel state is not suitable for link adaptation then the transmitter (UE) is configured to abort the predictive scheduling and fall back to conservative scheduling and use a low modulation scheme, low channel coding rate and a small transport block size in line with a largest path loss assumption. In another example, if the model is in error and is determined not to match the actual channel state, the UE may send a trigger to abort link adaptation with explicit signalling, for example by deactivation of MAC CE. In another example, the NTN base station may understand that the UE has aborted link adaptation because the receiver detects and decodes that data using default communications parameters or an explicit report is received from the UE, if for example there is only a small amount of e power headroom available.

Embodiments of the present technique can provide an arrangement in which a UE is able to perform link adaptation without receiving channel state information from the NTN base station. In one example the UE can communicate uplink data whilst economically using transmission power, by reducing the transmission power to a minimum required for a given channel state and modulation and coding scheme. Furthermore a more efficient use of communications resources can be achieved by the wireless communications network through a reduced signalling overhead and an improved data rate by reducing a number of retransmissions at the NTN base station.

From UE point of view, the UE is able to select the optimal link adaptation parameters. UE transmissions can enjoy a low error rate without excessive transmission power.

From base station/network point of view, the network reduces the number of retransmissions or avoid cell throughput decrease. The network can enjoy efficient radio resource usage and reduction of signalling overhead in addition to user throughput increase.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the terminal device.

It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling. That is to say, the specific manner in which the relevant predefined information is established and shared between the various elements of the wireless telecommunications system is not of primary significance to the principles of operation described herein.

It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of transmitting data by a terminal device via a wireless communications system, the method comprising the terminal device
- receiving an indication of an initial value of a set of one or more communications parameters for transmitting radio signals carrying the data,
- modelling a state of a communications channel from the terminal device to a receiver of the radio signals,
- using a link adaptation procedure to select a revised value of the set of the one or more communications parameters with respect to the initial value of the set of the one or more communications parameters for the modelled channel state, and
- adapting the value of the set of the one or more communications parameters according to the revised value, and
- transmitting radio signals representing the data using the adapted set of the one or more communications parameters.

Paragraph 2. A method according to Paragraph 1, comprising
- determining by the terminal device a distance between the terminal device and a receiver of the radio signals, wherein the modelling the state of the communications channel includes
- estimating a path loss between the terminal device and the receiver, and
- estimating a power with which the transmitted radio signals are received by the receiver based on a power with which the radio signals are transmitted and the estimated path loss, and the link adaptation procedure includes
- selecting the revised value of the set of the one or more communications parameters with respect to the initial value using the estimated received signal power.

Paragraph 3. A method according to paragraph 2, wherein the terminal device includes a location detector for generating an estimate of a location of the terminal device and the determining, by the terminal device, the distance between the terminal device and the receiver of the radio signals includes
- receiving an indication of a location of the receiver of the transmitted radio signals when a communication session for transmitting the data starts, information indicating a path of travel of the receiver and a speed of the receiver, and when selecting the revised value of the one or more communications parameters according to the link adaptation procedure,
- estimating, at a time of modelling the channel state, a location of the receiver based on the location of the receiver when the communication session started, the path of travel of the receiver, the speed of the receiver and an elapsed time from the start of the communications session and the time of modelling the channel state
- estimating a location of the terminal device using the location detector,
- estimating the distance between the terminal device and the receiver based on the estimated location of the terminal device and the estimated location of the receiver.

Paragraph 4. A method according to paragraph 3, wherein the indication of the location of the receiver of the transmitted radio signals when the communication session starts, the information indicating the path of travel of the receiver and the speed of the receiver are received by the terminal device with the initial value of the set of the one or more communications parameters.

Paragraph 5. A method according to any of paragraphs 2, 3 or 4, wherein the path loss is estimated using an indication of at least one of a free space loss, attenuation due to atmospheric gasses, attenuation due to either ionospheric or tropospheric scintillation and building entry loss.

Paragraph 6. A method according to any of paragraphs 1 to 5, wherein the modelling the channel state includes generating an estimate of a signal to interference and noise ratio for the received radio signals at the receiver from the estimated power with which the transmitted radio signals are received by the receiver with respect to an estimate of noise power and an estimate of interference power.

Paragraph 7. A method according to paragraph 6, wherein the estimate of the noise power and the estimate of the interference power is received by the communications terminal with the indication of the initial value of the set of the one or more communications parameters.

Paragraph 8. A method according to paragraph 6 or 7, wherein the one or more communications parameters of the set includes a transmission power with which the radio signals are transmitted and the link adaptation includes adjusting the transmission power with respect to the estimated signal to interference and noise ratio for the received radio signals at the receiver.

Paragraph 9. A method according to paragraph 6 or 7, wherein the one or more communications parameters of the set includes a size of a modulation scheme which is used to modulate one or more carrier signals of the radio signals with the data to be transmitted, and an error correction encoding rate.

Paragraph 10. A method according to paragraph 10, wherein the link adaptation includes selecting from a limited set of combinations of the size of the modulation scheme and the error correction encoding rate.

Paragraph 11. A method according to any of paragraphs 1 to 10, wherein receiver forms part of a non-terrestrial network access node, the terminal device and the non-terrestrial network access node forming part of the wireless communications system Paragraph 12. A terminal device for transmitting data via a wireless communications system, the terminal device comprising
- transmitter circuitry configured to transmit radio signals representing the data via a wireless access interface to a receiver,
- receiver circuitry configured to receive radio signals transmitted from the wireless communications system, and
- controller circuitry configured to control the transmitter and the receiver to transmit and receive the radio signals, wherein the controller circuitry is configured
- to receive an indication of an initial value of a set of one or more communications parameters for transmitting radio signals carrying the data,
- to model a state of a communications channel from the terminal device to a receiver of the radio signals,
- to use a link adaptation procedure to select a revised value of the set of the one or more communications parameters with respect to the initial value of the set of the one or more communications parameters for the modelled channel state,
- to adapt the value of the set of the one or more communications parameters according to the revised value, and to transmit radio signals representing the data using the set of the one or more communications parameters.

Paragraph 13. A method of receiving uplink data from a terminal device at network infrastructure equipment comprising a non-terrestrial network access node in a wireless telecommunications system comprising the network infrastructure equipment and a terminal device, the method comprising
  transmitting an indication of an initial value of a set of one or more communications parameters for the terminal device to transmit radio signals carrying uplink data to be received, and
  receiving the uplink data transmitted with a revised value of the set of the one or more communications parameters which have been adapted with respect to the initial value of the set of the one or more communications parameters in accordance with a link adaptation procedure based on an estimate of a state of a communications channel between the terminal device the receiver circuitry estimated using a model of the channel state generated by the terminal device.

Paragraph 14. A method according to paragraph 13, comprising
  generating a model of the channel state to mimic the model of the channel state generated by the terminal device,
  generating an estimate of the revised value of the set of the one or more communications parameters which have been adapted with respect to the initial value of the set of the one or more communications parameters in accordance with the link adaptation procedure based on the model of the state channel performed at the receiver, and
  controlling the receiver to detect the radio signals and to estimate the uplink data in accordance with the estimate of the revised value of the set of the one or more communications parameters.

Paragraph 15. A method according to paragraph 13, wherein the controlling the receiver to detect the radio signals and to estimate the uplink data includes
  detecting the radio signals and estimating the uplink data using a blind detection technique by attempting possible values of the set of the one or more link adaptation parameters until the uplink data is determined to have been correctly decoded.

Paragraph 16. Network infrastructure equipment comprising a non-terrestrial network access node in a wireless telecommunications system comprising the network infrastructure equipment and a terminal device, the network infrastructure equipment comprising
  transmitter circuitry configured to transmit radio signals representing data via a wireless access interface,
  receiver circuitry configured to receive radio signals via the wireless access interface, and controller circuitry configured to control the transmitter and the receiver to transmit and receive the radio signals, wherein the controller is configured control the transmitter
  to transmit an indication of an initial value of a set of one or more communications parameters for the terminal device to transmit radio signals carrying uplink data to be received, and to control the receiver
  to receive the uplink data transmitted with a revised value of the set of the one or more communications parameters which have been adapted with respect to the initial value of the set of the one or more communications parameters in accordance with a link adaptation procedure based on an estimate of a state of a communications channel between the terminal device the receiver circuitry estimated using a model of the channel state generated by the terminal device.

Paragraph 17. Network infrastructure equipment according to paragraph 16, wherein the controller is configured
  to generate a model of the channel state to mimic the model of the channel state generated by the terminal device,
  to generate an estimate of the revised value of the set of the one or more communications parameters which have been adapted with respect to the initial value of the set of the one or more communications parameters in accordance with the link adaptation procedure based on the model of the state channel performed at the receiver, and
  to control the receiver to detect the radio signals and to estimate the uplink data in accordance with the estimate of the revised value of the set of the one or more communications parameters.

Paragraph 18. Network infrastructure equipment according to paragraph 16, wherein the controller is configured to control the receiver to detect the radio signals and to estimate the uplink data using a blind detection technique attempting possible values of the set of the one or more link adaptation parameters until the uplink data is determined to have been correctly decoded.

Paragraph 19. Circuitry for transmitting data via a wireless communications system, the circuitry comprising
  transmitter circuitry configured to transmit radio signals representing the data via a wireless access interface to a receiver,
  receiver circuitry configured to receive radio signals transmitted from the wireless communications system, and
  controller circuitry configured to control the transmitter and the receiver to transmit and receive the radio signals, wherein the controller circuitry is configured
  to receive an indication of an initial value of a set of one or more communications parameters for transmitting radio signals carrying the data,
  to model a state of a communications channel from the terminal device to a receiver of the radio signals,
  to use a link adaptation procedure to select a revised value of the set of the one or more communications parameters with respect to the initial value of the set of the one or more communications parameters for the modelled channel state,
  to adapt the value of the set of the one or more communications parameters according to the revised value, and
  to transmit radio signals representing the data using the set of the one or more communications parameters.

Paragraph 20. Circuitry comprising
  transmitter circuitry configured to transmit radio signals representing data via a wireless access interface,
  receiver circuitry configured to receive radio signals via the wireless access interface, and controller circuitry configured to control the transmitter and the receiver to transmit and receive the radio signals, wherein the controller is configured control the transmitter
  to transmit an indication of an initial value of a set of one or more communications parameters for a terminal device to transmit radio signals carrying uplink data to be received, and to control the receiver
  to receive the uplink data transmitted with a revised value of the set of the one or more communications parameters which have been adapted with respect to the initial value of the set of the one or more communications parameters in accordance with a link adaptation procedure based on an estimate of a state of a communications channel between the terminal device the receiver circuitry estimated using a model of the channel state generated by the terminal device.

REFERENCES

[1] 3GPP TR 38.811 "Study on New Radio (NR) to support non terrestrial networks (Release 15)", December 2017
[2] Holma H. and Toskala A, "LTE for UMTS OFDMA and SC-FDMA based radio access", John Wiley and Sons, 2009

The invention claimed is:

1. A method of transmitting data by a terminal device via a wireless communications system, the method comprising:
receiving an indication of an initial value of a set of one or more communications parameters for transmitting radio signals carrying the data;
modelling a state of a communications channel from the terminal device to a receiver of the radio signals by estimating a path loss between the terminal device and the receiver, and estimating a power with which the transmitted radio signals are received by the receiver based on a power with which the radio signals are transmitted and the estimated path loss;
using a link adaptation procedure to select a revised value of the set of the one or more communications parameters with respect to the initial value of the set of the one or more communications parameters for the modelled channel state;
adapting the value of the set of the one or more communications parameters according to the revised value; and
transmitting radio signals representing the data using the adapted set of the one or more communications parameters.

2. A terminal device for use in a wireless communications system, the terminal device comprising:
circuitry configured to
receive an indication of an initial value of a set of one or more communications parameters for transmitting radio signals carrying the data;
model a state of a communications channel from the terminal device to a receiver of the radio signals by estimating a path loss between the terminal device and the receiver, and estimating a power with which the transmitted radio signals are received by the receiver based on a power with which the radio signals are transmitted and the estimated path loss;
use a link adaptation procedure to select a revised value of the set of the one or more communications parameters with respect to the initial value of the set of the one or more communications parameters for the modelled channel state;
adopt the value of the set of the one or more communications parameters according to the revised value; and
transmit radio signals representing the data using the adapted set of the one or more communications parameters.

3. The terminal device of claim 2, wherein
the circuitry is configured to determine a distance between the terminal device and the receiver of the radio signals.

4. The terminal device of claim 2, wherein
the link adaptation procedure includes selecting the revised value of the set of the one or more communications parameters with respect to the initial value using the estimated received signal power.

5. The terminal device of claim 4, wherein
the circuitry is configured to generate an estimate of a location of the terminal device.

6. The terminal device of claim 5, wherein
the circuitry is configured to determine a distance between the terminal device and the receiver of the radio signals by
receiving an indication of a location of the receiver of the transmitted radio signals when a communication session for transmitting the data starts and information indicating a path of travel of the receiver and a speed of the receiver, and
when selecting the revised value of the one or more communications parameters according to the link adaptation procedure,
estimating, at a time of modelling the channel state, a location of the receiver based on the location of the receiver when the communication session started, the path of travel of the receiver, the speed of the receiver and an elapsed time from the start of the communications session and the time of modelling the channel state,
estimating a location of the terminal device using the location detector, and
estimating the distance between the terminal device and the receiver based on the estimated location of the terminal device and the estimated location of the receiver.

7. The terminal device of claim 6, wherein
the indication of the location of the receiver of the transmitted radio signals when the communication session starts, the information indicating the path of travel of the receiver and the speed of the receiver are received by the terminal device with the initial value of the set of the one or more communications parameters.

8. The terminal device of claim 2, wherein
the circuitry is configured to estimate the path loss using an indication of at least one of a free space loss, attenuation due to atmospheric gasses, attenuation due to either ionospheric or tropospheric scintillation and building entry loss.

9. The terminal device of claim 2, wherein
the modelling the channel state includes generating an estimate of a signal to interference and noise ratio for the received radio signals at the receiver from the estimated power with which the transmitted radio signals are received by the receiver with respect to an estimate of noise power and an estimate of interference power.

10. The terminal device of claim 9, wherein
the estimate of the noise power and the estimate of the interference power is received with the indication of the initial value of the set of the one or more communications parameters.

11. The terminal device of claim 9, wherein
the one or more communications parameters of the set includes a transmission power with which the radio signals are transmitted, and the link adaptation includes adjusting the transmission power with respect to the estimated signal to interference and noise ratio for the received radio signals at the receiver.

12. The terminal device of claim 9, wherein
the one or more communications parameters of the set includes a size of a modulation scheme which is used to modulate one or more carrier signals of the radio signals with the data to be transmitted, and an error correction encoding rate.

13. The terminal device of claim 2, wherein
the link adaptation includes selecting from a limited set of combinations of the size of the modulation scheme and the error correction encoding rate.

14. The terminal device of claim 2, wherein
the receiver forms part of a non-terrestrial access node, the terminal device and the non-terrestrial network access node forming part of the wireless communications system.

15. Network infrastructure equipment for a wireless telecommunications system, the network infrastructure equipment comprising:
    circuitry configured to
        transmit an indication of an initial value of a set of one or more communications parameters for a terminal device to transmit radio signals carrying uplink data to be received; and
        receive the uplink data transmitted with a revised value of the set of the one or more communications parameters which have been adapted with respect to the initial value of the set of the one or more communications parameters in accordance with a link adaptation procedure based on an estimate of a state of a communications channel between the terminal device the receiver circuitry estimated using a model of the channel state generated by the terminal device, wherein
        the circuitry is configured to detect the radio signals and to estimate the uplink data using a blind detection technique attempting possible values of the set of the one or more link adaptation parameters until the uplink data is determined to have been correctly decoded.

16. The network infrastructure equipment of claim 15, wherein
    the circuitry is configured to generate a model of the channel state to mimic the model of the channel state generated by the terminal device.

17. The network infrastructure equipment of claim 16, wherein
    the circuitry is configured to generate an estimate of the revised value of the set of the one or more communications parameters which have been adapted with respect to the initial value of the set of the one or more communications parameters in accordance with the link adaptation procedure based on the model of the state channel performed at the receiver.

18. The network infrastructure equipment of claim 17, wherein
    the circuitry is configured to detect the radio signals and to estimate the uplink data in accordance with the estimate of the revised value of the set of the one or more communications parameters.

* * * * *